United States Patent
Fritz et al.

(10) Patent No.: US 12,433,797 B2
(45) Date of Patent: Oct. 7, 2025

(54) ELASTIC ENTRAPMENT WITH WAIST CAP BONDING

(71) Applicant: Curt G. Joa, Inc.

(72) Inventors: Jeffrey W. Fritz, Plymouth, WI (US); David E. Schuette, Kiel, WI (US)

(73) Assignee: Curt G. Joa, Inc., Sheboygan Falls, WI (US)

( * ) Notice: Subject to any disclaimer, the term of this patent is extended or adjusted under 35 U.S.C. 154(b) by 14 days.

(21) Appl. No.: 16/947,236

(22) Filed: Jul. 24, 2020

(65) Prior Publication Data

US 2021/0059866 A1    Mar. 4, 2021

Related U.S. Application Data

(60) Provisional application No. 62/895,645, filed on Sep. 4, 2019.

(51) Int. Cl.
| | | |
|---|---|---|
| *A61F 13/15* | (2006.01) | |
| *A61F 13/49* | (2006.01) | |
| *B32B 5/02* | (2006.01) | |

(52) U.S. Cl.
CPC .... *A61F 13/15577* (2013.01); *A61F 13/4902* (2013.01); *B32B 5/022* (2013.01); *A61F 2013/49025* (2013.01); *B32B 2555/02* (2013.01)

(58) Field of Classification Search
None
See application file for complete search history.

(56) References Cited

U.S. PATENT DOCUMENTS

| | | | |
|---|---|---|---|
| 3,580,783 | A | 5/1971 | Glaze |
| 3,589,100 | A | 6/1971 | Konars et al. |
| 3,622,434 | A | 11/1971 | Newman |
| 3,658,064 | A | 4/1972 | Pociluyko |
| 3,668,054 | A | 6/1972 | Stumpf |

(Continued)

FOREIGN PATENT DOCUMENTS

| | | |
|---|---|---|
| CN | 101868210 B | 9/2014 |
| EP | 0274752 A2 | 7/1988 |

(Continued)

OTHER PUBLICATIONS

WO 2010/110203A machine translation (Year: 2010).*

(Continued)

*Primary Examiner* — Barbara J Musser
(74) *Attorney, Agent, or Firm* — Klintworth & Rozenblat LLP

(57) ABSTRACT

An elastic composite structure includes a first web layer comprising a first portion, a second portion, and a third portion; a second web layer comprising a first portion and a second portion; and a plurality of elastic threads. The first portion of the first web layer is folded over and overlaps the second portion of the first web layer. The folded first portion of the first web layer is directly bonded to one of the second portion of the first web layer and the first portion of the second web layer. A first portion of the plurality of elastic threads is constrained between the folded first portion of the first web layer and the second portion of the first web layer absent adhesive. The third portion is directly bonded to the second portion of the second web layer and traps a second portion of the plurality of elastic threads therebetween.

8 Claims, 12 Drawing Sheets

(56) References Cited

U.S. PATENT DOCUMENTS

| | | |
|---|---|---|
| 3,844,869 A | 10/1974 | Rust, Jr. |
| 3,884,227 A | 5/1975 | Lutz et al. |
| 3,982,988 A | 9/1976 | Heimberger |
| 3,993,532 A | 11/1976 | McDonald et al. |
| 4,088,731 A | 5/1978 | Groome |
| 4,305,988 A | 12/1981 | Kocher et al. |
| 4,305,998 A | 12/1981 | Manty et al. |
| 4,333,978 A | 6/1982 | Kocher |
| 4,336,203 A | 6/1982 | Zucker et al. |
| 4,443,291 A | 4/1984 | Reed |
| 4,485,819 A | 12/1984 | Igl |
| 4,662,005 A | 5/1987 | Grier-Idris |
| 4,770,656 A | 9/1988 | Proxmire et al. |
| 4,808,176 A | 2/1989 | Kielpikowski |
| 4,833,734 A | 5/1989 | Der Estephanian |
| 4,834,738 A | 5/1989 | Kielpikowski et al. |
| 4,834,741 A | 5/1989 | Sabee |
| 4,842,596 A | 6/1989 | Kielpikowski et al. |
| 4,863,542 A | 9/1989 | Oshefsky et al. |
| 4,919,738 A | 4/1990 | Ball et al. |
| 4,977,011 A | 12/1990 | Smith |
| 5,094,717 A | 3/1992 | Manning et al. |
| 5,163,932 A | 11/1992 | Nomura et al. |
| 5,353,798 A | 10/1994 | Sieben |
| 5,468,320 A | 11/1995 | Zafiroglu |
| 5,530,979 A | 7/1996 | Whitley |
| 5,561,863 A | 10/1996 | Gerald, II |
| 5,618,378 A | 4/1997 | Cahill |
| 5,624,420 A | 4/1997 | Bridges et al. |
| 5,643,395 A | 7/1997 | Hinton |
| 5,643,396 A | 7/1997 | Rajala et al. |
| 5,660,657 A | 8/1997 | Rajala et al. |
| 5,694,925 A | 12/1997 | Reese et al. |
| 5,699,791 A | 12/1997 | Sukiennik et al. |
| 5,707,470 A | 1/1998 | Rajala et al. |
| 5,711,847 A | 1/1998 | Rajala et al. |
| 5,745,922 A | 5/1998 | Rajala et al. |
| 5,769,993 A | 6/1998 | Baldauf |
| 5,789,065 A | 8/1998 | Haffner et al. |
| 5,797,895 A | 8/1998 | Widlund et al. |
| 5,803,075 A | 9/1998 | Yavitz |
| 5,813,398 A | 9/1998 | Baird et al. |
| 5,817,584 A | 10/1998 | Singer et al. |
| 5,883,026 A | 3/1999 | Reader et al. |
| 5,934,275 A | 8/1999 | Gazzara |
| 5,954,055 A | 9/1999 | Miyake |
| D424,688 S | 5/2000 | Bryant et al. |
| 6,055,982 A | 5/2000 | Brunson et al. |
| 6,057,024 A | 5/2000 | Mleziva et al. |
| 6,062,220 A | 5/2000 | Whitaker et al. |
| 6,123,077 A | 9/2000 | Bostock et al. |
| 6,125,849 A | 10/2000 | Williams et al. |
| 6,165,298 A | 12/2000 | Samida et al. |
| 6,173,712 B1 | 1/2001 | Brunson |
| 6,197,404 B1 | 3/2001 | Varona |
| 6,213,125 B1 | 4/2001 | Reese et al. |
| 6,217,889 B1 | 4/2001 | Lorenzi et al. |
| 6,235,137 B1 | 5/2001 | Van Eperen et al. |
| 6,257,235 B1 | 7/2001 | Bowen |
| 6,279,570 B1 | 8/2001 | Mittelstadt et al. |
| 6,291,039 B1 | 9/2001 | Combe et al. |
| 6,295,714 B1 | 10/2001 | Roychowdhury et al. |
| 6,332,465 B1 | 12/2001 | Xue et al. |
| 6,340,782 B1 | 1/2002 | Kling et al. |
| 6,354,296 B1 | 3/2002 | Baumann et al. |
| 6,394,090 B1 | 5/2002 | Chen et al. |
| 6,427,693 B1 | 8/2002 | Blackstock et al. |
| 6,460,539 B1 | 10/2002 | Japuntich et al. |
| 6,482,278 B1 | 11/2002 | Mccabe et al. |
| 6,484,722 B2 | 11/2002 | Bostock et al. |
| 6,506,474 B2 | 1/2003 | Tsuji |
| 6,534,694 B2 | 3/2003 | Kling et al. |
| 6,536,434 B1 | 3/2003 | Bostock et al. |
| 6,541,679 B2 | 4/2003 | Betrabet et al. |
| 6,568,392 B1 | 5/2003 | Bostock et al. |
| 6,584,976 B2 | 7/2003 | Japuntich et al. |
| 6,604,524 B1 | 8/2003 | Curran et al. |
| 6,613,955 B1 | 9/2003 | Lindsay et al. |
| 6,623,837 B2 | 9/2003 | Morman et al. |
| 6,644,314 B1 | 11/2003 | Elsberg |
| 6,652,693 B2 | 11/2003 | Burriss et al. |
| 6,673,980 B1 | 1/2004 | Varona et al. |
| 6,676,062 B1 | 1/2004 | Herhaus |
| 6,701,992 B1 | 3/2004 | Pasquale et al. |
| 6,712,922 B2 | 3/2004 | Sorenson et al. |
| 6,715,489 B2 | 4/2004 | Bostock et al. |
| 6,722,366 B2 | 4/2004 | Bostock et al. |
| 6,730,188 B2 | 5/2004 | Sanders |
| 6,761,710 B2 | 7/2004 | Acchioli et al. |
| 6,780,263 B2 | 8/2004 | Delisle |
| 6,843,872 B2 | 1/2005 | Morman |
| 6,886,563 B2 | 5/2005 | Bostock et al. |
| 6,889,622 B2 | 5/2005 | Marcangelo |
| 6,914,018 B1 | 7/2005 | Uitenbroek et al. |
| 6,928,657 B2 | 8/2005 | Bell et al. |
| 6,953,452 B2 | 10/2005 | Popp et al. |
| 7,008,496 B2 | 3/2006 | Morman |
| 7,021,227 B2 | 4/2006 | Marcangelo |
| 7,025,841 B2 | 4/2006 | Owen |
| 7,044,131 B2 | 5/2006 | Griesbach et al. |
| 7,069,930 B2 | 7/2006 | Bostock et al. |
| 7,118,558 B2 | 10/2006 | Wu et al. |
| 7,198,688 B2 | 4/2007 | Mortell et al. |
| 7,211,531 B2 | 5/2007 | Schneider et al. |
| 7,217,261 B2 | 5/2007 | Otsubo et al. |
| 7,290,545 B2 | 11/2007 | Kleman et al. |
| 7,316,840 B2 | 1/2008 | Neculescu et al. |
| 7,361,241 B2 | 4/2008 | Barth et al. |
| 7,378,566 B2 | 5/2008 | Soerens et al. |
| 7,464,516 B2 | 12/2008 | Johnson |
| 7,469,427 B2 | 12/2008 | Yang et al. |
| 7,507,680 B2 | 3/2009 | Middlesworth et al. |
| 7,582,348 B2 | 9/2009 | Ando et al. |
| 7,617,787 B2 | 11/2009 | Marcangelo |
| 7,619,167 B2 | 11/2009 | Lee et al. |
| 7,638,014 B2 | 12/2009 | Coose et al. |
| 7,642,398 B2 | 1/2010 | Jarpenberg et al. |
| 7,691,138 B2 | 4/2010 | Stenzel et al. |
| 7,708,849 B2 | 5/2010 | McCabe |
| 7,722,734 B2 | 5/2010 | Otsubo |
| 7,725,948 B2 | 6/2010 | Steindorf |
| 7,799,967 B2 | 9/2010 | Ranganathan et al. |
| 7,833,369 B2 | 11/2010 | Zhou et al. |
| 7,845,351 B2 | 12/2010 | Mathis et al. |
| 7,861,756 B2 | 1/2011 | Jenquin et al. |
| 7,901,392 B2 | 3/2011 | Kline et al. |
| 7,955,418 B2 | 6/2011 | Claussen et al. |
| 7,981,231 B2 | 7/2011 | Schneider et al. |
| 8,007,484 B2 | 8/2011 | Mccabe et al. |
| 8,074,660 B2 | 12/2011 | Duffy |
| 8,075,543 B2 | 12/2011 | Okuda |
| 8,091,550 B2 | 1/2012 | Steindorf |
| 8,109,916 B2 | 2/2012 | Wennerbaeck |
| 8,142,411 B2 | 3/2012 | Kline et al. |
| 8,146,594 B2 | 4/2012 | Bostock et al. |
| 8,182,457 B2 | 5/2012 | Olson et al. |
| 8,182,624 B2 | 5/2012 | Handziak |
| 8,207,395 B2 | 6/2012 | Soerens et al. |
| 8,268,444 B2 | 9/2012 | Okaya |
| 8,282,617 B2 | 10/2012 | Kaneda et al. |
| 8,298,205 B2 | 10/2012 | Norrby et al. |
| 8,308,706 B2 | 11/2012 | Fukae |
| 8,323,257 B2 | 12/2012 | Melik et al. |
| 8,328,820 B2 | 12/2012 | Diamant et al. |
| 8,360,067 B2 | 1/2013 | Duffy |
| 8,375,950 B2 | 2/2013 | Bostock et al. |
| 8,435,223 B2 | 5/2013 | Roe et al. |
| 8,440,043 B1 | 5/2013 | Schneider et al. |
| 8,470,946 B1 | 6/2013 | Carlson |
| 8,528,560 B2 | 9/2013 | Duffy |
| 8,562,777 B2 | 10/2013 | Drake |
| 8,585,667 B2 | 11/2013 | Roe et al. |
| 8,622,059 B2 | 1/2014 | Kleman |
| 8,640,704 B2 | 2/2014 | Spoo et al. |

(56) References Cited

U.S. PATENT DOCUMENTS

| | | |
|---|---|---|
| 8,647,319 B2 | 2/2014 | Een et al. |
| 8,652,114 B2 | 2/2014 | Roe et al. |
| 8,652,115 B2 | 2/2014 | Roe et al. |
| 8,669,409 B2 | 3/2014 | Roe |
| 8,702,671 B2 | 4/2014 | Tsang et al. |
| 8,740,128 B2 | 6/2014 | Oravits et al. |
| 8,741,083 B2 | 6/2014 | Wennerbaeck et al. |
| 8,758,786 B2 | 6/2014 | Hassler |
| 8,771,449 B2 | 7/2014 | Takino et al. |
| 8,784,395 B2 | 7/2014 | Roe et al. |
| 8,784,397 B2 | 7/2014 | Chang et al. |
| 8,808,263 B2 | 8/2014 | Roe et al. |
| 8,881,729 B2 | 11/2014 | Duffy |
| 8,926,579 B2 | 1/2015 | Wang et al. |
| 8,932,273 B2 | 1/2015 | Roe et al. |
| 8,936,586 B2 | 1/2015 | Roe |
| 8,992,497 B2 | 3/2015 | Roe et al. |
| 8,998,870 B2 | 4/2015 | Roe |
| 9,011,402 B2 | 4/2015 | Roe et al. |
| 9,011,404 B2 | 4/2015 | Kobayashi et al. |
| 9,012,013 B2 | 4/2015 | Duffy |
| 9,028,462 B2 * | 5/2015 | Poole ............... A61F 13/49011 604/394 |
| 9,056,033 B2 | 6/2015 | Fenske |
| 9,060,905 B2 | 6/2015 | Wang et al. |
| 9,078,789 B2 | 7/2015 | Wang et al. |
| 9,078,792 B2 | 7/2015 | Ruiz |
| 9,089,456 B2 | 7/2015 | Roe et al. |
| 9,095,478 B2 | 8/2015 | Roe |
| 9,180,059 B2 | 11/2015 | Roe et al. |
| 9,301,881 B2 | 4/2016 | Ando et al. |
| 9,387,138 B2 | 7/2016 | Roe |
| 9,539,735 B2 | 1/2017 | Ferguson et al. |
| 9,603,395 B2 | 3/2017 | Duffy |
| 9,603,396 B2 | 3/2017 | Duffy |
| 9,615,612 B2 | 4/2017 | Duffy |
| 9,770,057 B2 | 9/2017 | Duffy |
| 9,770,058 B2 | 9/2017 | Angadjivand et al. |
| 9,770,611 B2 | 9/2017 | Facer et al. |
| 9,809,414 B2 | 11/2017 | Fritz et al. |
| 9,868,002 B2 | 1/2018 | Duffy |
| 9,913,764 B2 | 3/2018 | Thomas et al. |
| 10,040,621 B2 | 8/2018 | Duffy et al. |
| 10,130,833 B2 | 11/2018 | Angadjivand et al. |
| 10,137,321 B2 | 11/2018 | Martin |
| 10,143,246 B2 | 12/2018 | Houde et al. |
| D837,970 S | 1/2019 | Henderson et al. |
| 10,182,603 B2 | 1/2019 | Duffy |
| 10,213,348 B2 | 2/2019 | Gualtieri et al. |
| 10,227,202 B2 | 3/2019 | Pamperin et al. |
| 10,259,165 B2 | 4/2019 | Ehlert et al. |
| D848,678 S | 5/2019 | Andrews |
| 10,314,346 B2 | 6/2019 | Potnis et al. |
| 10,329,110 B2 | 6/2019 | Dotta |
| 10,457,436 B2 | 10/2019 | Spencer et al. |
| 10,492,547 B2 | 12/2019 | Weber et al. |
| 10,494,221 B2 | 12/2019 | Harris et al. |
| 10,518,996 B2 | 12/2019 | Adami |
| 10,537,479 B2 | 1/2020 | Schuette et al. |
| 10,596,045 B2 | 3/2020 | Koshijima et al. |
| 10,596,047 B2 | 3/2020 | Coenen et al. |
| 10,751,228 B2 | 8/2020 | Kurohara et al. |
| 10,758,428 B2 | 9/2020 | Nakamura et al. |
| 10,786,398 B2 | 9/2020 | Koshijima et al. |
| 10,792,194 B2 | 10/2020 | Hohm et al. |
| 10,889,066 B2 | 1/2021 | Begrow et al. |
| 10,893,986 B2 | 1/2021 | Manabe et al. |
| 10,973,703 B2 | 4/2021 | Coenen et al. |
| 11,020,281 B2 | 6/2021 | Ishikawa |
| 11,020,286 B2 | 6/2021 | Kaufman et al. |
| 11,117,771 B2 | 9/2021 | Hada et al. |
| 11,129,753 B2 | 9/2021 | Schneider et al. |
| 11,141,321 B2 | 10/2021 | Schneider et al. |
| 11,147,717 B2 | 10/2021 | Schneider et al. |
| 11,173,072 B2 | 11/2021 | Fritz |
| 11,191,676 B2 | 12/2021 | Koshijima et al. |
| 11,219,555 B2 | 1/2022 | Schneider et al. |
| 11,254,062 B2 | 2/2022 | Ehlert et al. |
| 11,254,066 B2 | 2/2022 | Begrow et al. |
| 11,399,989 B2 | 8/2022 | Polidori et al. |
| 11,433,620 B2 | 9/2022 | Ehlert et al. |
| 11,701,268 B2 | 7/2023 | Andrews et al. |
| 2001/0025683 A1 | 10/2001 | Burriss et al. |
| 2001/0034508 A1 | 10/2001 | Betrabet et al. |
| 2001/0044250 A1 | 11/2001 | Tsuji |
| 2002/0092604 A1 | 7/2002 | Mccabe et al. |
| 2002/0116027 A1 | 8/2002 | Egan et al. |
| 2002/0117575 A1 | 8/2002 | Gilmore et al. |
| 2002/0119288 A1 | 8/2002 | Morman et al. |
| 2002/0157778 A1 | 10/2002 | Sorenson et al. |
| 2003/0051803 A1 | 3/2003 | Sanders |
| 2003/0120250 A1 | 6/2003 | Betrabet et al. |
| 2003/0124306 A1 | 7/2003 | Morman |
| 2003/0125706 A1 | 7/2003 | Popp et al. |
| 2003/0125707 A1 | 7/2003 | Popp et al. |
| 2003/0135185 A1 | 7/2003 | Crowther |
| 2003/0144643 A1 | 7/2003 | Jarpenberg et al. |
| 2004/0005832 A1 | 1/2004 | Neculescu et al. |
| 2004/0059280 A1 | 3/2004 | Makower et al. |
| 2004/0112509 A1 | 6/2004 | Morman |
| 2004/0116885 A1 | 6/2004 | Soerens et al. |
| 2004/0127614 A1 | 7/2004 | Jiang et al. |
| 2004/0138635 A1 | 7/2004 | Soerens et al. |
| 2004/0158217 A1 | 8/2004 | Wu et al. |
| 2004/0192140 A1 | 9/2004 | Schneider et al. |
| 2004/0219854 A1 | 11/2004 | Groitzsch et al. |
| 2004/0226645 A1 | 11/2004 | Owen |
| 2004/0243085 A1 | 12/2004 | Veith et al. |
| 2004/0261230 A1 | 12/2004 | Neeb et al. |
| 2005/0095942 A1 | 5/2005 | Mueller et al. |
| 2005/0101216 A1 | 5/2005 | Middlesworth et al. |
| 2005/0131374 A1 | 6/2005 | Otsubo et al. |
| 2005/0142331 A1 | 6/2005 | Anderson et al. |
| 2005/0148261 A1 | 7/2005 | Close et al. |
| 2005/0176029 A1 | 8/2005 | Heller et al. |
| 2005/0183646 A1 | 8/2005 | Marcangelo |
| 2005/0216058 A1 | 9/2005 | Egan et al. |
| 2005/0228350 A1 | 10/2005 | Ranganathan et al. |
| 2006/0009104 A1 | 1/2006 | Schneider et al. |
| 2006/0069373 A1 | 3/2006 | Schlinz et al. |
| 2006/0099871 A1 | 5/2006 | Poruthoor et al. |
| 2006/0130964 A1 | 6/2006 | Mccabe |
| 2006/0135923 A1 | 6/2006 | Boggs et al. |
| 2006/0135932 A1 | 6/2006 | Abuto et al. |
| 2006/0138693 A1 | 6/2006 | Tuman et al. |
| 2006/0149208 A1 | 7/2006 | Carr |
| 2006/0180068 A1 | 8/2006 | Marcangelo |
| 2006/0184149 A1 | 8/2006 | Kasai et al. |
| 2006/0224137 A1 | 10/2006 | Mccabe et al. |
| 2006/0228969 A1 | 10/2006 | Erdman et al. |
| 2006/0238757 A1 | 10/2006 | Silcott |
| 2006/0270302 A1 | 11/2006 | Ando et al. |
| 2007/0000021 A1 | 1/2007 | Yang et al. |
| 2007/0068529 A1 | 3/2007 | Kalatoor et al. |
| 2007/0131335 A1 | 6/2007 | Zhou et al. |
| 2007/0175477 A1 | 8/2007 | Baggett |
| 2007/0218245 A1 | 9/2007 | Schneider et al. |
| 2007/0286987 A1 | 12/2007 | Anderson et al. |
| 2008/0103460 A1 | 5/2008 | Close et al. |
| 2008/0110554 A1 | 5/2008 | Otsubo |
| 2008/0169373 A1 | 7/2008 | Andrews et al. |
| 2008/0262455 A1 | 10/2008 | Soerens et al. |
| 2008/0312625 A1 | 12/2008 | Hundorf et al. |
| 2009/0134049 A1 | 5/2009 | Melik et al. |
| 2009/0163940 A1 | 6/2009 | Sliwa |
| 2009/0208703 A1 | 8/2009 | Wennerbaeck et al. |
| 2009/0242098 A1 | 10/2009 | Handziak |
| 2009/0306616 A1 | 12/2009 | Wennerbaeck |
| 2009/0326503 A1 | 12/2009 | Lakso et al. |
| 2009/0326504 A1 | 12/2009 | Kaneda |
| 2010/0015190 A1 | 1/2010 | Hassler |
| 2010/0076390 A1 | 3/2010 | Norrby et al. |
| 2010/0076394 A1 | 3/2010 | Hayase et al. |
| 2010/0087352 A1 | 4/2010 | Mason |

(56) References Cited

U.S. PATENT DOCUMENTS

| | | |
|---|---|---|
| 2010/0286709 A1 | 11/2010 | Diamant et al. |
| 2010/0298798 A1 | 11/2010 | Lakso et al. |
| 2010/0324513 A1 | 12/2010 | Wennerbaeck |
| 2011/0055998 A1 | 3/2011 | Tai et al. |
| 2011/0061786 A1 | 3/2011 | Mason |
| 2011/0067797 A1 | 3/2011 | Schneider et al. |
| 2011/0098668 A1* | 4/2011 | Thorson .............. A61F 13/49058 604/385.24 |
| 2011/0118689 A1 | 5/2011 | Een et al. |
| 2011/0152811 A1 | 6/2011 | Bing-Wo et al. |
| 2011/0184372 A1 | 7/2011 | Esping et al. |
| 2011/0192888 A1 | 8/2011 | Tai et al. |
| 2011/0251576 A1 | 10/2011 | Ando et al. |
| 2011/0257616 A1 | 10/2011 | Lakso et al. |
| 2012/0088103 A1 | 4/2012 | Sugiura et al. |
| 2012/0095429 A1 | 4/2012 | Kobayashi et al. |
| 2012/0123367 A1 | 5/2012 | Melik et al. |
| 2012/0123368 A1 | 5/2012 | Melik et al. |
| 2012/0123369 A1 | 5/2012 | Melik et al. |
| 2012/0123370 A1 | 5/2012 | Melik et al. |
| 2012/0123371 A1 | 5/2012 | Melik et al. |
| 2012/0123372 A1 | 5/2012 | Melik et al. |
| 2012/0123373 A1 | 5/2012 | Melik et al. |
| 2012/0175064 A1 | 7/2012 | Yamamoto |
| 2012/0228988 A1 | 9/2012 | Cutsforth |
| 2012/0321856 A1 | 12/2012 | Afshari |
| 2012/0328841 A1 | 12/2012 | Afshari |
| 2012/0328842 A1 | 12/2012 | Afshari |
| 2013/0011601 A1 | 1/2013 | Fenske |
| 2013/0012899 A1 | 1/2013 | Fenske |
| 2013/0042411 A1 | 2/2013 | Vitale |
| 2013/0048191 A1 | 2/2013 | Durrance et al. |
| 2013/0079797 A1 | 3/2013 | Diamant et al. |
| 2013/0157012 A1 | 6/2013 | Qin et al. |
| 2013/0165896 A1 | 6/2013 | Carbonari |
| 2013/0255865 A1 | 10/2013 | Brown et al. |
| 2014/0093687 A1 | 4/2014 | Humiston et al. |
| 2014/0099469 A1 | 4/2014 | Abuto et al. |
| 2014/0102650 A1 | 4/2014 | Qin et al. |
| 2014/0180126 A1 | 6/2014 | Millett et al. |
| 2015/0050462 A1 | 2/2015 | Schroer, Jr. |
| 2015/0164705 A1 | 6/2015 | Thomas et al. |
| 2016/0058624 A1 | 3/2016 | Hohm et al. |
| 2016/0228305 A1 | 8/2016 | Gualtieri et al. |
| 2016/0288407 A1 | 10/2016 | Ehlert et al. |
| 2016/0331600 A1 | 11/2016 | Polidori et al. |
| 2017/0113366 A1 | 4/2017 | Ferguson et al. |
| 2017/0281417 A1 | 10/2017 | Ishikawa |
| 2018/0027899 A1 | 2/2018 | Facer et al. |
| 2018/0042788 A1 | 2/2018 | Kurohara et al. |
| 2018/0093444 A1 | 4/2018 | Begrow et al. |
| 2018/0140473 A1 | 5/2018 | Koshijima et al. |
| 2018/0147095 A1 | 5/2018 | Koshijima et al. |
| 2018/0168880 A1 | 6/2018 | Schneider et al. |
| 2018/0169964 A1 | 6/2018 | Schneider et al. |
| 2018/0170027 A1 | 6/2018 | Schneider et al. |
| 2018/0280209 A1 | 10/2018 | Manabe et al. |
| 2019/0000162 A1 | 1/2019 | Houde |
| 2019/0021916 A1 | 1/2019 | Ishikawa |
| 2019/0070041 A1 | 3/2019 | Schneider et al. |
| 2019/0209396 A1 | 7/2019 | Nakamura et al. |
| 2019/0224053 A1 | 7/2019 | Nakamura et al. |
| 2019/0231606 A1 | 8/2019 | Andrews et al. |
| 2019/0274895 A1* | 9/2019 | Chen .................. A61F 13/4902 |
| 2019/0358093 A1 | 11/2019 | Kaufman et al. |
| 2019/0374398 A1 | 12/2019 | Coenen et al. |
| 2019/0374404 A1 | 12/2019 | Ninomiya et al. |
| 2020/0039152 A1 | 2/2020 | Ehlert et al. |
| 2020/0179180 A1 | 6/2020 | Koshijima et al. |
| 2020/0197230 A1 | 6/2020 | Ohtsubo |
| 2020/0206040 A1 | 7/2020 | Andrews et al. |
| 2020/0206043 A1 | 7/2020 | Coenen et al. |
| 2020/0214901 A1 | 7/2020 | Andrews et al. |
| 2020/0268567 A1 | 8/2020 | Coenen et al. |
| 2020/0297551 A1 | 9/2020 | Andrews et al. |
| 2020/0298545 A1 | 9/2020 | Andrews et al. |
| 2020/0299883 A1 | 9/2020 | Begrow et al. |
| 2020/0360191 A1 | 11/2020 | Nakamura et al. |
| 2020/0361158 A1 | 11/2020 | Sugiura et al. |
| 2021/0000657 A1 | 1/2021 | Hohm et al. |
| 2021/0100695 A1 | 4/2021 | Ishibashi et al. |
| 2021/0205152 A1 | 7/2021 | Polidori et al. |
| 2021/0252796 A1 | 8/2021 | Ehlert et al. |
| 2021/0267818 A1 | 9/2021 | Kaufman et al. |
| 2022/0000676 A1 | 1/2022 | Schneider et al. |
| 2022/0071809 A1 | 3/2022 | Fritz |
| 2022/0151840 A1 | 5/2022 | Mueller et al. |
| 2022/0211553 A1 | 7/2022 | Manabe |
| 2022/0218534 A1 | 7/2022 | Minami et al. |
| 2022/0250331 A1 | 8/2022 | Weiler et al. |
| 2022/0324669 A1 | 10/2022 | Follen et al. |
| 2023/0339714 A1 | 10/2023 | Roehrborn et al. |

FOREIGN PATENT DOCUMENTS

| | | |
|---|---|---|
| EP | 0330716 A2 | 9/1989 |
| EP | 0168225 B1 | 3/1991 |
| EP | 0307871 B1 | 12/1992 |
| EP | 0386324 B1 | 6/1993 |
| EP | 685586 | 12/1995 |
| EP | 677284 | 6/1999 |
| EP | 886480 | 12/2001 |
| EP | 1166721 A2 | 1/2002 |
| EP | 1035808 B1 | 3/2004 |
| EP | 1024721 B1 | 9/2004 |
| EP | 1351815 B1 | 2/2005 |
| EP | 1555000 A2 | 7/2005 |
| EP | 1388410 B1 | 10/2005 |
| EP | 1448824 B1 | 10/2005 |
| EP | 1236827 B1 | 1/2006 |
| EP | 1029521 B1 | 4/2006 |
| EP | 1138471 B1 | 6/2006 |
| EP | 1159942 B1 | 7/2006 |
| EP | 1641417 B1 | 6/2007 |
| EP | 1547558 B1 | 10/2008 |
| EP | 1290289 B1 | 12/2008 |
| EP | 1330355 B1 | 3/2009 |
| EP | 1263989 B1 | 5/2009 |
| EP | 1330222 B1 | 8/2009 |
| EP | 1458553 B1 | 9/2009 |
| EP | 2103427 A2 | 9/2009 |
| EP | 1610950 B1 | 10/2009 |
| EP | 1715994 B1 | 3/2010 |
| EP | 1520569 B1 | 7/2010 |
| EP | 1586252 B1 | 8/2010 |
| EP | 1959907 B1 | 9/2010 |
| EP | 1525345 B1 | 4/2011 |
| EP | 1882177 B1 | 6/2011 |
| EP | 1707168 B1 | 8/2011 |
| EP | 1716831 B1 | 9/2011 |
| EP | 2083100 B1 | 9/2011 |
| EP | 2207926 B1 | 9/2011 |
| EP | 2219534 B1 | 9/2011 |
| EP | 2027841 B1 | 7/2012 |
| EP | 1595017 B1 | 8/2012 |
| EP | 1891256 B1 | 8/2012 |
| EP | 2020972 B1 | 11/2012 |
| EP | 2020974 B1 | 12/2012 |
| EP | 1685816 B1 | 1/2013 |
| EP | 2024178 B1 | 1/2013 |
| EP | 2088980 B1 | 1/2013 |
| EP | 1272347 B1 | 4/2013 |
| EP | 1458565 B1 | 3/2014 |
| EP | 2727521 A1 | 5/2014 |
| EP | 1575470 B1 | 6/2014 |
| EP | 2088981 B1 | 6/2014 |
| EP | 2431013 B1 | 9/2014 |
| EP | 2441866 B1 | 2/2015 |
| EP | 2133297 B1 | 4/2016 |
| EP | 1806117 B1 | 6/2016 |
| EP | 3028687 | 6/2016 |
| EP | 3092997 | 11/2016 |
| EP | 3117810 A1 | 1/2017 |
| EP | 1666178 B1 | 5/2017 |

(56) References Cited

FOREIGN PATENT DOCUMENTS

| | | |
|---|---|---|
| EP | 2214614 B1 | 8/2017 |
| EP | 2450015 B1 | 11/2017 |
| EP | 2105115 B1 | 3/2018 |
| EP | 2116367 B1 | 4/2018 |
| EP | 2142261 B1 | 5/2018 |
| EP | 2454957 B1 | 11/2018 |
| EP | 3527181 A1 | 8/2019 |
| EP | 3199132 B1 | 9/2019 |
| EP | 3056176 B1 | 10/2019 |
| EP | 3296100 B1 | 1/2020 |
| EP | 3646830 A1 | 5/2020 |
| EP | 3677231 A1 | 7/2020 |
| EP | 3747636 A1 | 12/2020 |
| EP | 3558192 B1 | 1/2021 |
| EP | 3558664 B1 | 4/2021 |
| EP | 3519162 B1 | 7/2021 |
| EP | 3572052 B1 | 7/2021 |
| EP | 3558193 B1 | 8/2021 |
| EP | 3865103 A1 | 8/2021 |
| EP | 3558191 B1 | 9/2021 |
| EP | 3275413 B1 | 10/2021 |
| EP | 3342385 B1 | 10/2021 |
| EP | 3527182 B1 | 10/2021 |
| EP | 3675785 B1 | 11/2021 |
| EP | 3904057 A1 | 11/2021 |
| EP | 3299167 B1 | 3/2022 |
| EP | 3960140 A1 | 3/2022 |
| EP | 3960439 A1 | 3/2022 |
| EP | 3981371 A1 | 4/2022 |
| EP | 3675784 B1 | 10/2022 |
| FR | 2532337 | 3/1984 |
| JP | 2005095574 A | 4/2005 |
| JP | 2008154998 A | 7/2008 |
| JP | 2009056156 A | 3/2009 |
| JP | 2009106667 A | 5/2009 |
| JP | 5085239 | 11/2012 |
| JP | 05106990 B2 | 12/2012 |
| JP | 05124188 B2 | 1/2013 |
| JP | 2014198179 A | 10/2014 |
| JP | 2017064130 A | 4/2017 |
| JP | 06192003 B2 | 9/2017 |
| JP | 2019030441 A | 2/2019 |
| KR | 1982464 B1 | 5/2019 |
| KR | 2013608 B1 | 8/2019 |
| KR | 2022211 B1 | 9/2019 |
| RU | 2304047 C2 | 8/2007 |
| RU | 2010125133 A | 12/2011 |
| WO | WO1993021788 A1 | 11/1993 |
| WO | WO0192013 A1 | 12/2001 |
| WO | WO2009067055 A1 | 5/2009 |
| WO | WO2011087502 A1 | 7/2011 |
| WO | WO2014109924 A1 | 7/2014 |
| WO | WO2014145668 A1 | 9/2014 |
| WO | 2016033226 | 3/2016 |
| WO | 2016109514 | 7/2016 |
| WO | WO2016160752 A1 | 10/2016 |
| WO | 2016208513 | 12/2016 |
| WO | WO-2018097771 A1 * | 5/2018 ....... A61F 13/15593 |
| WO | 2018118431 A1 | 6/2018 |
| WO | WO2018118573 A1 | 6/2018 |
| WO | 2018/154680 A1 | 8/2018 |
| WO | WO2018160207 A1 | 9/2018 |
| WO | WO2018160208 A1 | 9/2018 |
| WO | WO2019070248 A1 | 4/2019 |
| WO | WO-2019125415 A1 * | 6/2019 ............. A61F 13/49 |
| WO | WO2020198025 A1 | 10/2020 |
| WO | WO2021043943 A1 | 3/2021 |

OTHER PUBLICATIONS

Presentation by Thomas Ehlert, VP of RD&E, Aurizon Ultrasonics, LLC, entitled "Adhesive-free, Ultrasonic Elastic Attachment", date at least as early as Nov. 17, 2014, 57 pages.
Japanese Office Action for Application No. JP2020-541440 Dated Feb. 7, 2023.
PCT International Search Report and Written Opinion, PCT/US2015/047015, dated Nov. 24, 2015, 8 pages.
Notification of Reasons for Refusal issued in Japanese Application No. 2020-147443, dated Oct. 23, 2023, 5 pages.

* cited by examiner

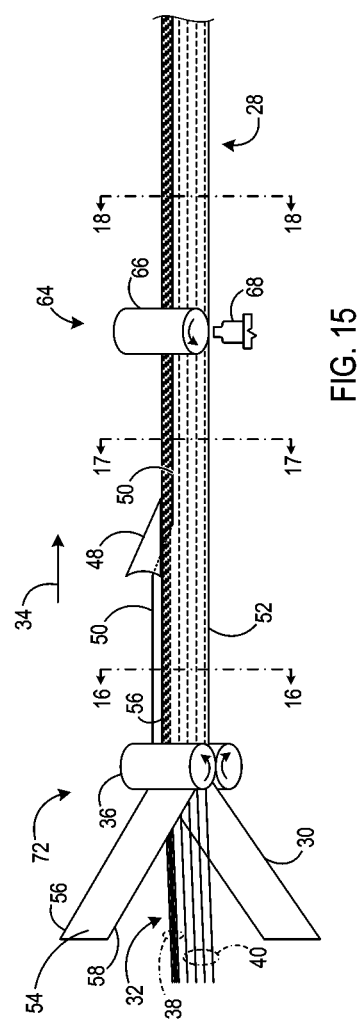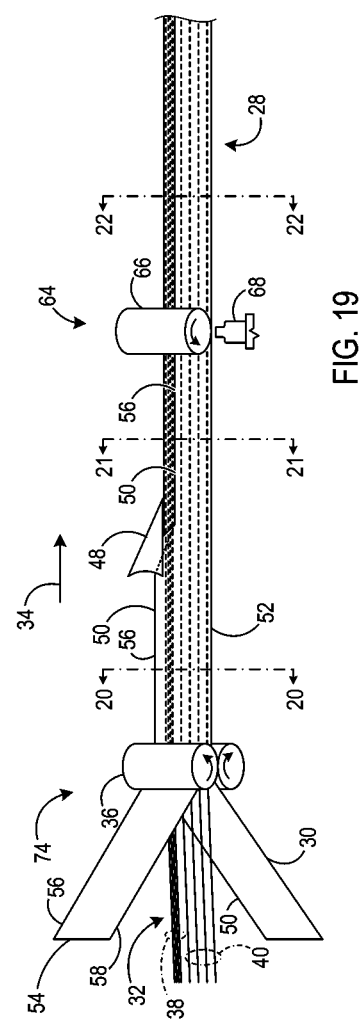

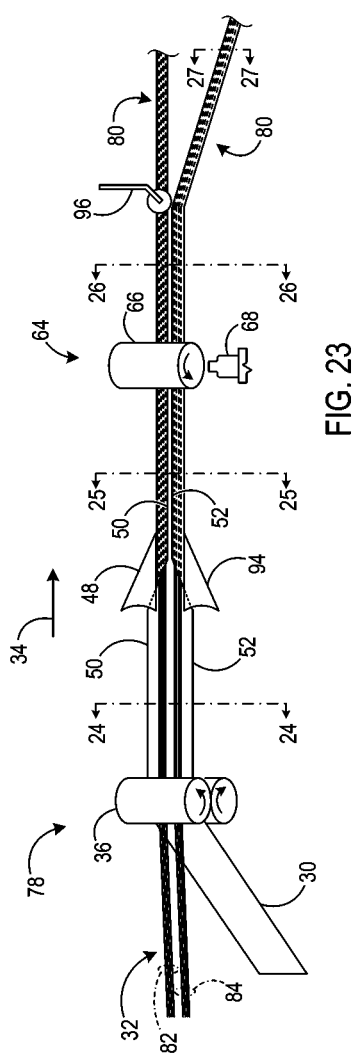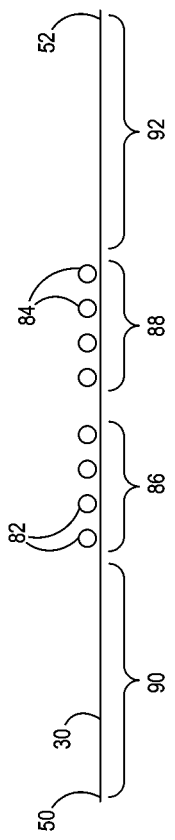

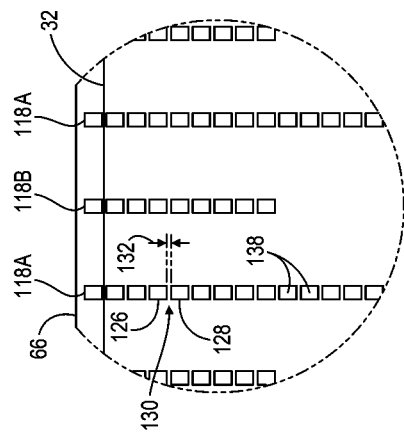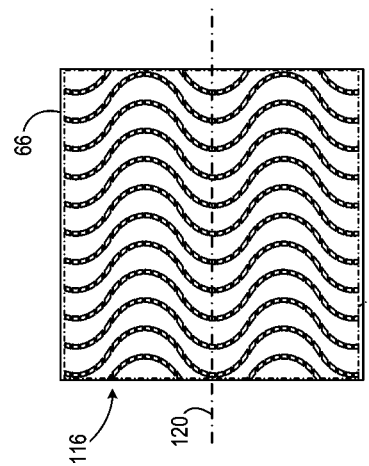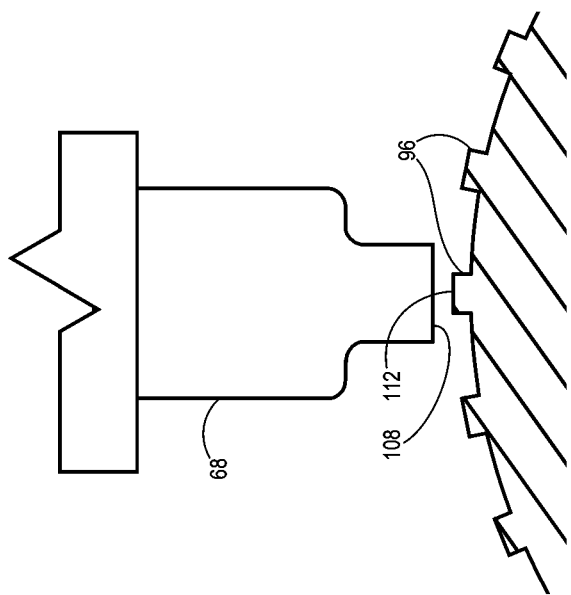

ELASTIC ENTRAPMENT WITH WAIST CAP BONDING

CROSS-REFERENCE TO RELATED APPLICATION

This application is a nonprovisional of and claims priority to U.S. Patent Application Ser. No. 62/895,645, filed Sep. 4, 2019, the disclosure of which is incorporated herein by reference in its entirety.

BACKGROUND OF THE INVENTION

Embodiments of the invention relate generally to absorbent sanitary products and, more particularly, to an improved apparatus and method for manufacturing an elastic waist composite structure for use in an absorbent sanitary product that includes bonding the waist cap of the elastic waist without the use of consumable adhesives such as glue.

Absorbent sanitary products, such as disposable diapers, are typically equipped with elastic composite structures that include one or more elastic threads. These elastic composite structures are positioned at various locations throughout the product, including in the waistbands, leg cuff regions, and throughout all or portions of the front or back panels of the product. During the typical manufacturing process of an elastic waistband 10 as illustrated in FIG. 1, the elastic threads 12 are positioned in a tensioned state between a first web layer 14 and a second web layer 16. First and second web layers 14, 16 are typically layers of non-woven materials or webs. Elastic threads 12 are positioned in groups forming waist elastic 18 and belly elastic 20 and can contain more or less strands 12 than depicted in FIG. 1.

As illustrated in FIG. 2, first and second web layers 14, 16 are bonded together around elastic threads 12. In a non-adhesive bonding method, first and second web layers 14, 16 are bonded together ultrasonically by an ultrasonic bonding system known in the art.

The second web layer 16 has an entrapment area 22 extending beyond the end of the first web layer 14 that is folded over to seal the waist elastic portion. FIG. 3 illustrates application of an adhesive 24 in the area of the entrapment area 22. Alternatively or in addition thereto, the adhesive 24 may be applied to the first web layer 14 in the region of the waist elastic 18.

FIG. 4 illustrates the entrapment area 22 folded over the first web layer 14 and adhesively attached thereto to form a waist foldover or waist cap. The tension in the elastic threads is subsequently released, causing the web material to pucker or fold in the areas that contain the adhered elastic threads and waist foldover.

The use of adhesives to attach the entrapment area 22 to create the waist cap presents a number of disadvantages in both the end product and manufacturing method, including costs associated with the consumable material and undesirable tactile properties of the end product (e.g., stiffness) and the addition of a separate step in the manufacturing of the elastic waistband 10 additional to the bonding of the first and second web layers 14, 16 together. Accordingly, there is a need for an improved apparatus and method for fabricating a waist cap.

BRIEF DESCRIPTION OF THE INVENTION

In accordance with one aspect of the invention an elastic composite structure includes a first web layer comprising a first portion, a second portion, and a third portion; a second web layer comprising a first portion and a second portion; and a plurality of elastic threads positioned adjacently to the second and third portions of the first web layer. The first portion of the first web layer is folded over and overlaps the second portion of the first web layer. The folded first portion of the first web layer is directly bonded to one of the second portion of the first web layer and the first portion of the second web layer. A first portion of the plurality of elastic threads is constrained between the folded first portion of the first web layer and the second portion of the first web layer absent adhesive. The third portion of the first web layer is directly bonded to the second portion of the second web layer and traps a second portion of the plurality of elastic threads therebetween.

In accordance with another aspect of the invention, a method of forming an elastic composite structure includes providing a first web layer comprising a first portion, a second portion, and a third portion; threading a plurality of elastic threads adjacently to the second and third portions of the first web layer; and providing a second web layer comprising a first portion and a second portion. The method also includes folding the first portion of the first web layer over the second portion of the first web layer and bonding the folded first portion of the first web to one of the second portion of the first web layer and the first portion of the second web layer. The method further includes bonding the third portion of the first web layer to the second portion of the second web layer. A first portion of the plurality of elastic threads is trapped between the first and second portions of the first layer absent adhesive and a second portion of the plurality of elastic threads is trapped between the third portion of the first web layer and the second portion of the second web layer.

In accordance with yet another aspect of the invention, an apparatus for forming an elastic composite structure includes a plurality of rollers configured to guide a combined web assembly in a machine direction. The combined web assembly includes a first web layer comprising a first portion, a second portion, and a third portion; a second web layer comprising a first portion and a second portion; and a plurality of elastic threads positioned between the first and second web layers. The apparatus also includes a folding apparatus configured to fold the first portion of the first web layer over the second portion of the first web layer and a bonding apparatus configured to bond the folded first portion of the first web layer to one of the second portion of the first web layer and the first portion of the second web layer such that a first portion of the plurality of elastic threads is trapped between the folded first portion of the first layer and the second portion of the first layer absent adhesive. The bonding apparatus is also configured to bond the third portion of the first web layer to the second portion of the second web layer such that a second portion of the plurality of elastic threads is trapped between the third portion of the first web layer to the second portion of the second web layer.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings:

FIG. 15 is a schematic view of manufacturing line for making an elastic waistband according to another embodiment of the invention.

FIG. 19 is a schematic view of manufacturing line for making an elastic waistband according to another embodiment of the invention.

FIG. 23 is a schematic view of manufacturing line for making an elastic waistband according to another embodiment of the invention.

FIG. 24 is a cross-sectional view taken along line 24-24 of FIG. 23.

FIG. 29 is a detailed view of a portion of the bonding apparatus of FIG. 23 illustrating the horn aligned with an anchoring weld on the rotary anvil, according to one embodiment of the invention.

FIG. 30A is a detailed view of a portion of the rotary anvil of FIG. 30.

FIG. 31 is a flattened representation of an exemplary anvil pattern usable with the manufacturing line of FIG. 5, 10, 15, or 19 according to another embodiment of the invention.

DETAILED DESCRIPTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
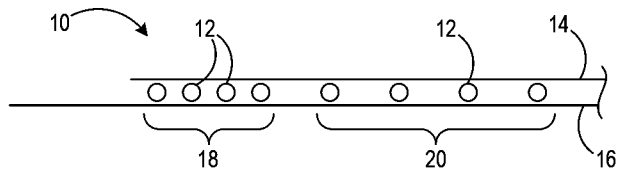
FIGS. 1-4 illustrate a prior art method of forming an elastic waistband with an adhesively-attached waist cap.
Figure 2:
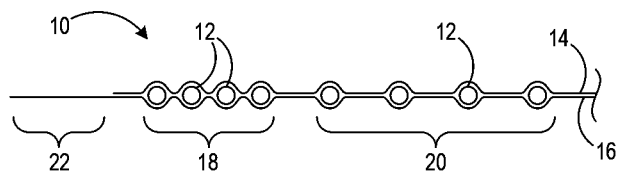
Figure 3:
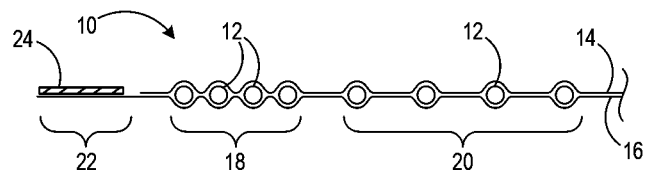
Figure 4:
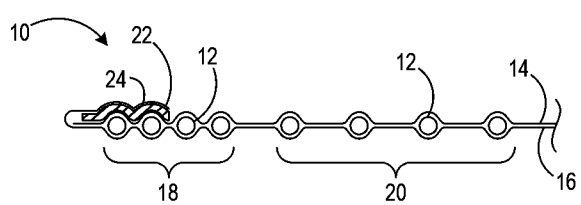
Figure 5:
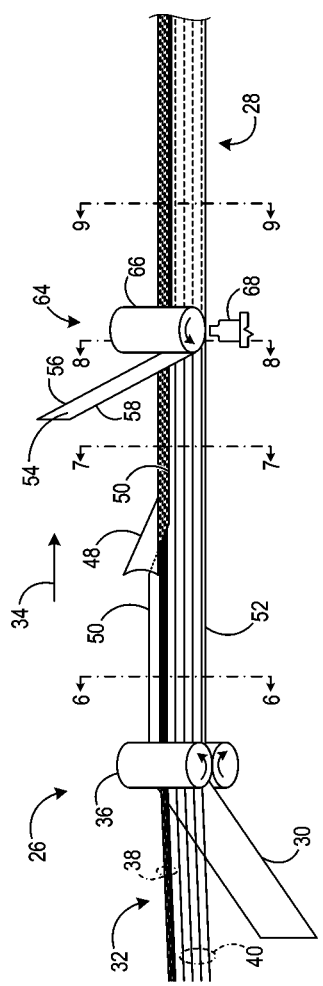
FIG. 5 is a schematic view of manufacturing line for making an elastic waistband according to one embodiment of the invention.

Referring now to FIG. 5, a portion of an exemplary manufacturing line 26 for producing a composite web 28 is illustrated according to one embodiment of the invention. As shown, a first web layer 30 and a plurality of elastic threads or strands 32 are fed in the machine direction 34 by a roller assembly 36, which may include one or more rollers. Elastic threads 32 includes a first group of elastic threads 38 (referred to hereafter as waist elastic threads) and a second group of elastic threads 40. While composite web 28 is referred to hereafter as a waist web 28 and the first and second groups of elastic threads 38, 40 are referred to hereafter as waist and belly elastic threads, respectively, it is contemplated that the techniques disclosed herein may be used to manufacture a composite web usable in other elasticized regions of an absorbent sanitary product, such as leg or leg cuff elastic regions, or in elasticized regions of other types of disposable garments.

Returning to the discussion of FIG. 5, the elastic threads 32 travel in the machine direction 34 under tension from a creel assembly (not shown) or similar device. Elastic threads 32 may have any suitable cross-sectional shape that facilitates formation of an elastic composite structure having desired elasticity, visual aesthetic, and manufacturability. As non-limiting examples, elastic threads 32 may have a cross-sectional shape that is round, rectangular, square, or irregular as may be the case where each elastic thread 32 is a multifilament product. The elastic threads 32 may be composed of any suitable elastic material including, for example, sheets, strands or ribbons of thermoplastic elastomers, natural or synthetic rubber, or elastic strands, as non-limiting examples. Each elastic thread 32 may be provided in the form of an individual elastomeric strand or be a manufactured multifilament product that includes many individual elastomeric filaments joined together, such as by a dry-spinning manufacturing process, to form a single, coalesced elastic thread 32.

Figure 6:
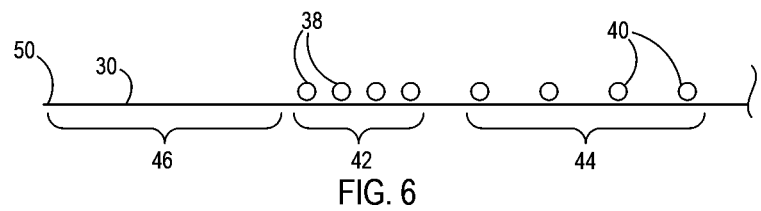
FIG. 6 is a cross-sectional view taken along line 6-6 of FIG. 5.

Referring to FIG. 6, a cross-section view of the waist web 28 taken along line 6-6 of FIG. 5 is illustrated. First web layer 30 includes a waist elastic portion 42 configured to receive the waist elastic threads 38 and a belly elastic thread portion 44 configured to receive the belly elastic threads 40. In addition, first web layer 30 includes a foldover portion 46 configured to be folded over at least the waist elastic threads 38 and waist elastic portion 42. Foldover portion 46 may also overlap a portion of the belly elastic thread 40 and the belly elastic thread portion 44.

Figure 7:
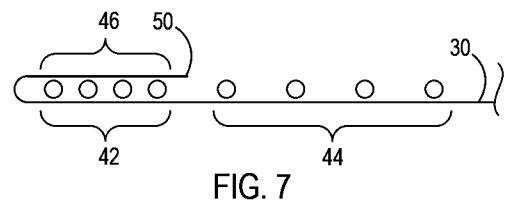
FIG. 7 is a cross-sectional view taken along line 7-7 of FIG. 5.

Referring back to FIG. 5, first web layer 30 and elastic threads 32 travel downstream to a folding assembly 48 such as a plow folder. Plow folder 48 is configured to fold over the foldover portion 46 of first web layer 30 so as to overlap at least a portion of the waist elastic portion 42 and may extend to overlap a portion of the belly elastic thread portion 44 as well. During folding, a first edge 50 of first web layer 30 is moved from being an outside edge of the first web layer 30 toward a second edge 52 on the other outside edge of the first web layer 30. As illustrated in the cross-section view of FIG. 7 taken along line 7-7 of FIG. 5, foldover portion 46 overlaps the waist elastic portion 42 after the folding.

Downstream of the plow folder 48, a second web layer 54 is brought together with the first web layer 30 and elastic threads 32 in the machine direction 34. First and second web layers 30 include materials capable of fusing to another web layer as described below upon application of an applied energy that causes one or both of the web layers to soften or melt and join together without the use of an intermediate layer of adhesive material such as glue. These facing pair of web layers 30, 54 may be the same type of material or different materials according to alternative embodiments. As non-limiting examples, first and second web layers 30, 54 may include nonwoven materials, woven materials, films, foams, and/or composites or laminates of any of these material types.

Figure 8:
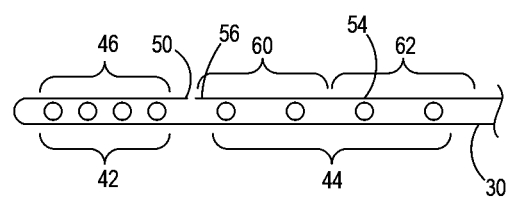
FIG. 8 is a cross-sectional view taken along line 8-8 of FIG. 5.

Second web layer 54 has opposing edges 56, 58, and as illustrated in the embodiment shown in FIG. 5 as well as in the cross-section view of FIG. 8 taken along line 8-8 of FIG. 5, edge 56 is positioned adjacently to edge 50 but does not overlap the foldover portion 46. However, other embodiments of the invention contemplate the second web layer 54 overlapping at least a portion of foldover portion 46 as described in FIG. 10 hereinbelow. Second web layer 54 includes a first portion 60 and a second portion 62 that, as shown in FIG. 8, overlap the belly elastic thread portion 44 of the first web layer 30.

In FIG. 5, after second web layer 54 is brought next to the first web layer 30 and elastic threads 32, the waist web portions are joined together via a bonding apparatus 64. Bonding apparatus 64 may be any known ultrasonic welding system in alternative embodiments, including, as non-limiting examples, a rotary ultrasonic welding system or a blade ultrasonic welding system. In the illustrated embodiment, bonding apparatus 64 includes a rotary anvil 66 and an ultrasonic fixed blade horn ultrasonic fixed blade horn 68, also known as a sonotrode, which cooperate with each other to bond (i.e., fuse) the first web layer 30 to the second web layer 54. Alternative embodiments may include multiple fixed blade horns or one or more rotary horns. During the bonding process the elastic threads 32 are secured or anchored in position relative to the first and second web layers 30, 54 as described in detail below.

While first web layer 30 and second web layer 54 are depicted in FIG. 5 and described herein as physically separate components, it is contemplated that alternative embodiments may utilize a unitary web structure that is folded to capture the elastic threads 32 between upper and lower layers of the unitary web structure. In such an embodiment, the portion of the unitary structure positioned below the elastic threads 32 would be referred to as the first web layer 30 and the portion of the unitary structure positioned above the elastic threads 32 would be referred to as the second web layer 54. For example, a second folding apparatus (not shown) similar to the folding apparatus 48 may be included to fold on portion of the unitary web structure over another portion of the unitary web structure to overlap the belly elastic thread portion 44 thereof.

Bonding apparatus 64 also includes one or more frames (not shown) that support and/or house a motor (not shown) that drives the ultrasonic horn 68, a vibration control unit (not shown) that ultrasonically energizes the horn 68 and causes the horn 68 to vibrate, and a second motor (not shown) that drives the anvil 66. The horn 68 and anvil 66 are positioned in a spaced relationship relative to one another to facilitate ultrasonically bonding the first and second web layers 30, 54 to one another while the elastic threads 32 are held in tension in the space between the horn 68 and anvil 66. During the bonding process, the first and second web layers 30, 54 are exposed to an ultrasonic emission from the horn 68 that increases the vibration of the particles in the first and second web layers 30, 54. The ultrasonic emission or energy is concentrated at specific bond points where frictional heat fuses the first and second web layers 30, 54 together without the need for consumable adhesives. While bonding apparatus 64 is described herein as an ultrasonic bonding assembly that ultrasonically fuses first web layer 30 to second web layer 54, it is contemplated that the techniques described herein may be extended to any other known welding or bonding techniques that fuse together two or more material layers without the use of adhesive, including sonic, thermal, or pressure bonding techniques and various other forms of welding known in the industry.

Figure 9:
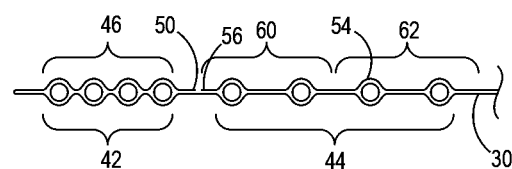
FIG. 9 is a cross-sectional view taken along line 9-9 of FIG. 5.
Figure 11:
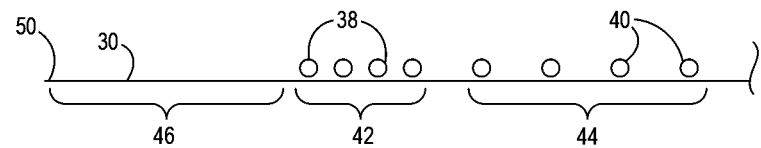
FIG. 11 is a cross-sectional view taken along line 11-11 of FIG. 10.
Figure 12:
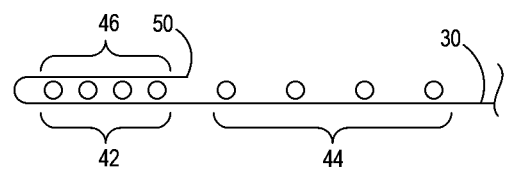
FIG. 12 is a cross-sectional view taken along line 12-12 of FIG. 10.

Referring to FIG. 9, a cross-sectional view of FIG. 5 taken along line 9-9 thereof shows the waist web 28 downstream of the second web layer 16. The foldover portion 46 of the first web layer 30 is fused to the waist elastic portion 42 of the first web layer 30 around the elastic threads 32, and the second web layer 54 is fused to the belly elastic thread portion 44 of the first web layer 30 around the elastic threads 32.

FIGS. 10-14 illustrate a manufacturing line 70 and manufactured waist web 28 according to another embodiment of the invention. The embodiment of the manufacturing line 70 shown in FIGS. 10-14 differs from the manufacturing line 26 shown in FIGS. 5-9 in the position and overlap of the edge 56 of the second web layer 54 with respect to the first web layer 30 and the elastic threads 32. The remaining aspects, features, and components of manufacturing line 70 are identical or substantially similar to those of manufacturing line 26 described above and will not be repeated.

Figure 10:
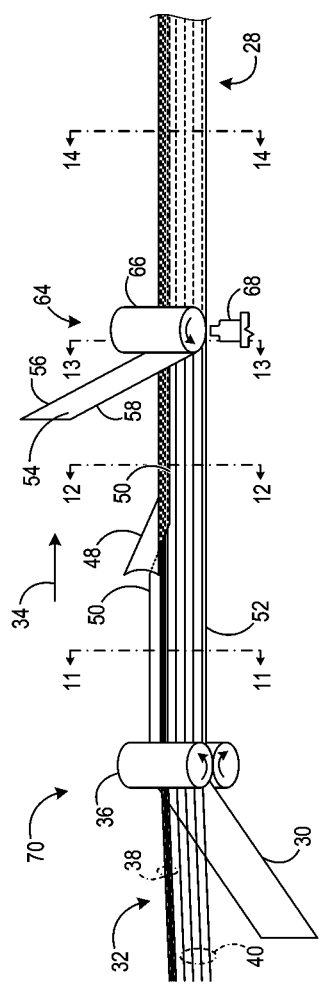
FIG. 10 is a schematic view of manufacturing line for making an elastic waistband according to another embodiment of the invention.
Figure 13:
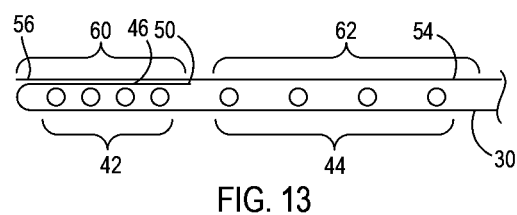
FIG. 13 is a cross-sectional view taken along line 13-13 of FIG. 10.

As shown in FIGS. 10 and 13, the second web layer 54 is brought into engagement with the first web layer 30 and the elastic threads 32 such that the edge 56 overlaps a portion of the foldover portion 46 of the first web layer 30. As shown, the edge 56 overlaps the entire foldover portion 46; however, other embodiments of more or less overlap are also contemplated.

Figure 14:
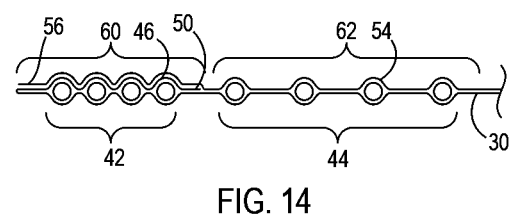
FIG. 14 is a cross-sectional view taken along line 14-14 of FIG. 10.
Figure 16:
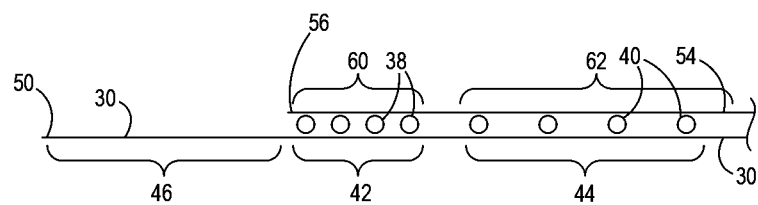
FIG. 16 is a cross-sectional view taken along line 16-16 of FIG. 15.
Figure 17:
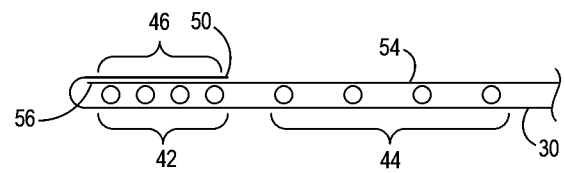
FIG. 17 is a cross-sectional view taken along line 17-17 of FIG. 15.

FIG. 14 shows that the bonding carried out through the bonding apparatus 64 bonds the overlapping portion of the second web layer 54 directly to the foldover portion 46 without any adhesive therebetween.

Figure 18:
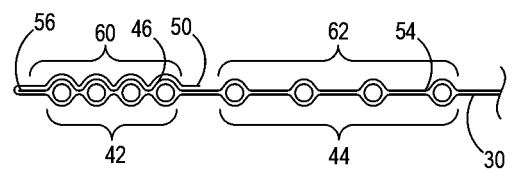
FIG. 18 is a cross-sectional view taken along line 18-18 of FIG. 15.
Figure 20:
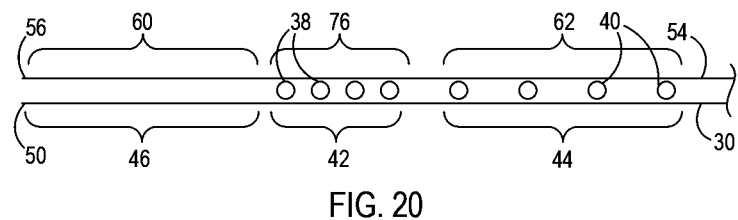
FIG. 20 is a cross-sectional view taken along line 20-20 of FIG. 19.

FIGS. 15-18 illustrate a manufacturing line 72 and manufactured waist web 28 according to another embodiment of the invention. The aspects, features, and components of manufacturing line 72 identical or substantially similar to those of manufacturing lines 26 or 70 described above will not be repeated. As illustrated, the introduction of the second web layer 54 into the waist web assembly 28 occurs prior to the plow folder 48 and at the joining of the elastic threads 32 with the first web layer 30 at the roller assembly 36. All three layers then proceed downstream to the plow folder 48, which folds over the foldover portion 46 of the first web layer 30 to overlap the edge 56 and adjacent portion of the second web layer 54 prior to bonding. As shown in FIG. 18, the foldover portion 46 is directly bonded to the edge 56 and adjacent portion of the second web layer 54, which are in turn directly bonded to the waist elastic portion 42 of the first web layer 30.

Manufacturing line 72 of FIG. 15 also can be used to manufacture the waist web 28 illustrated in FIG. 9 by varying the width of the second web layer 54. In such an embodiment, the second web layer 54 is introduced downstream from the plow folder 48 as illustrated in FIG. 15, but is sized to cover only a portion of the elastics 32 (e.g., belly elastics 40). First web layer 30 is then folded over the remaining elastics 32 (e.g., waist elastics 38) so that the edge of the first web layer 30 meets or is positioned adjacent the edge 56 of the second web layer 54, resulting in the same waist web configuration shown in FIG. 8.

FIGS. 19-22 illustrate a manufacturing line 74 and manufactured waist web 28 according to another embodiment of the invention. The aspects, features, and components of manufacturing line 74 identical or substantially similar to those of manufacturing lines 26, 70, or 72 described above will not be repeated. In contrast to the second web layer 54 illustrated with respect to manufacturing line 72, the edge 56 of the second web layer 54 shown in FIGS. 19-22 extends substantially as far as edge 50 of the first web layer 30 beyond the waist elastic threads 38 of the waist elastic portion 42. However, it is contemplated that the edge 56 may not extend as far as illustrated.

Figure 21:
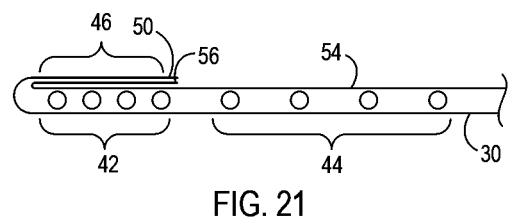
FIG. 21 is a cross-sectional view taken along line 21-21 of FIG. 19.
Figure 22:
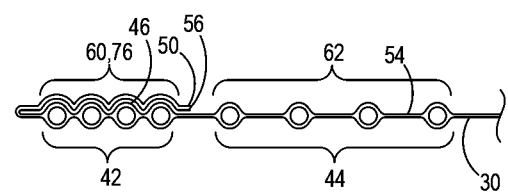
FIG. 22 is a cross-sectional view taken along line 22-22 of FIG. 19.

Second web layer 54 includes a third portion 76 illustrated between the first and second portions 60, 62. Accordingly, both edges 50, 56 are folded over via the plow folder 48 as illustrated in FIG. 21 to overlap both the third portion 76 of the second web layer 54 and the waist elastic portion 42 of the first web layer 30 and are bonded together to the third portion 76 of the second web layer 54 as illustrated in FIG. 22.

Directly bonding the waist elastic portion 42 of the first web layer 30 to another portion of the first web layer 30 or to the second web layer 54 as described in the embodiments herein reduces the manufacturing steps required to make the waist cap in the waist web 28. Because of the direct bonding, the additional step of applying an adhesive to the area to be joined by the waist elastic portion 42 is eliminated, and costs associated with using the adhesive in this area can also be eliminated.

FIGS. 23-27 illustrate a manufacturing line 78 and manufactured elastic bands 80 according to another embodiment of the invention. The aspects, features, and components of manufacturing line 78 that are identical or substantially similar to those of manufacturing lines 26, 70, 72, or 74 described above will not be repeated. Manufacturing line 78 includes the first web layer 30 and pairs of elastic thread groups 82, 84. While each thread group 82, 84 is illustrated as including multiple threads, it is contemplated that either thread group 82, 84 may include a single thread according to alternative embodiments. The edges 50, 52 of the first web layer 30 extend beyond the position of the elastic thread groups 82, 84 as illustrated in FIGS. 23, 24.

Referring to FIG. 24, a cross-section view taken along line 24-24 of FIG. 23 is illustrated. First web layer 30 includes a first elastic portion 86 configured to receive the elastic threads 82 and a second elastic portion 88 configured to receive the elastic threads 84. In addition, first web layer 30 includes a first foldover portion 90 configured to be folded over at least the elastic threads 82 and first elastic portion 86 and includes a second foldover portion 92 configured to be folded over at least the elastic threads 84 and second elastic portion 88.

Figure 25:
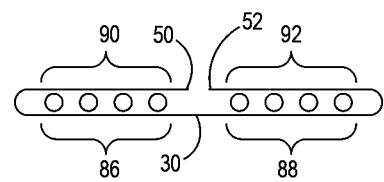
FIG. 25 is a cross-sectional view taken along line 25-25 of FIG. 23.
Figure 26:
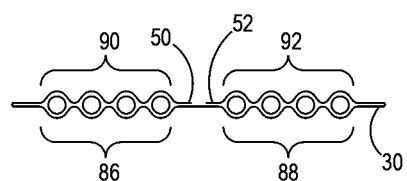
FIG. 26 is a cross-sectional view taken along line 26-26 of FIG. 23.
Figure 27:
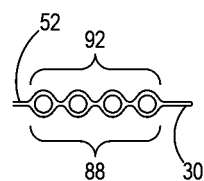
FIG. 27 is a cross-sectional view taken along line 27-27 of FIG. 23.

Referring back to FIG. 23, folding assembly 48 together with a second folding assembly 94 respectively fold over the first and second foldover portions 90, 92 of first web layer 30 so as to overlap the first and second elastic portions 86, 88 as illustrated in FIG. 25. Downstream of the folders 48, 92, the bonding apparatus 64 joins the first elastic portion 86 to the first foldover portion 90 and the second elastic portion 88 to the second foldover portion 92 as illustrated in FIG. 26.

A cutting assembly 96 (FIG. 23) is positioned to slit or cut the first web layer 30 into separate elastic bands 80. As illustrated, a rotary cutter or knife may be used to separate the first web layer 30. However, other cutting or slitting instruments such as fixed blades or knives or other methods known in the art may be used to separate the elastic bands 80. Additionally, while the cutting assembly 96 is shown downstream of the bonding apparatus 64, embodiments of the invention contemplate positioning the cutting assembly 96 upstream of the bonding apparatus 64 to slit or cut the first web layer 30 prior to the bonding process of the bonding apparatus 64.

In another embodiment, second folding assembly 94 and foldover portion 92 eliminated and folding assembly 48 configured to fold foldover portion 90 such that foldover portion 90 overlaps both first and second elastic portions. In this manner, edge 50 may be substantially aligned with edge 52 if desired. Cutting assembly 96 may separate the first web layer 30 into separate elastic bands 80 as described herein, and one elastic band 80 may have a folded edge on one side and two cut edges on the other side while the other elastic band 80 may have two cut edges on both sides.

Figure 28:
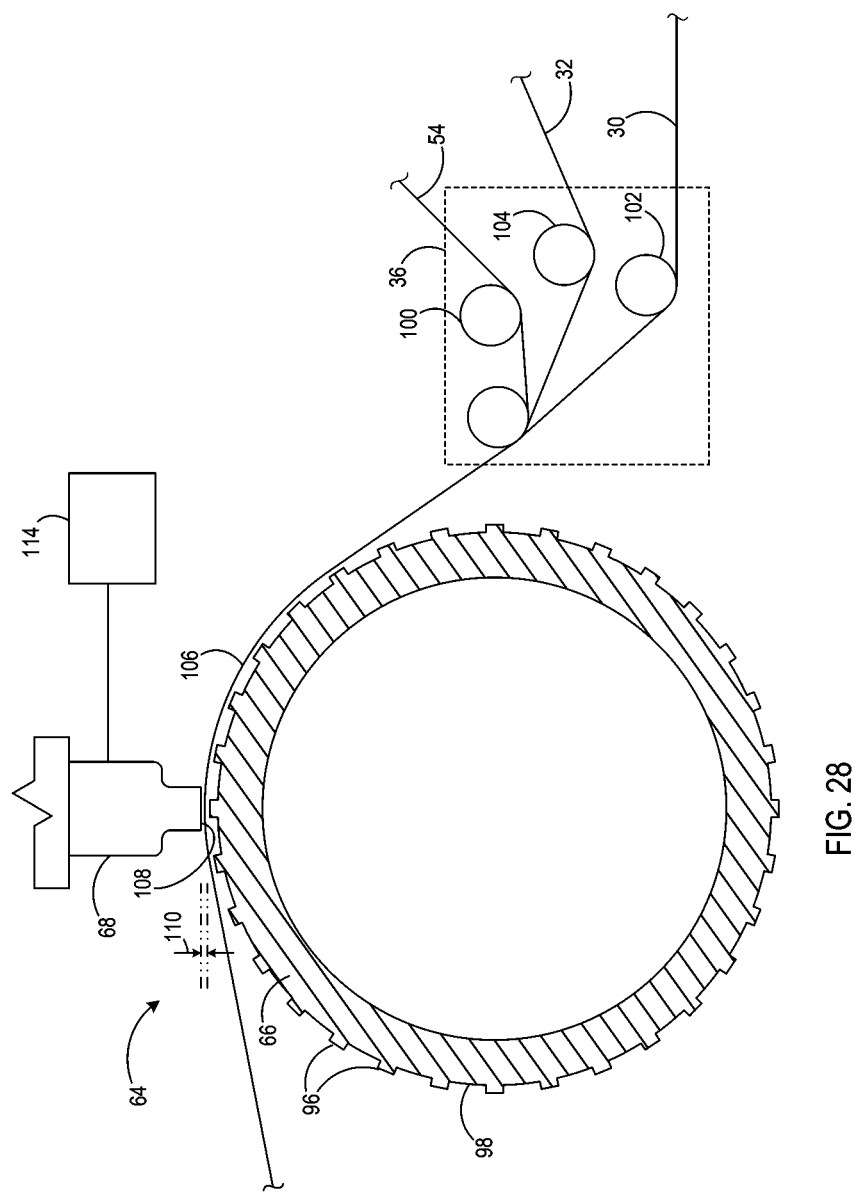
FIG. 28 is a schematic cross-sectional view of a bonding apparatus that is usable with the manufacturing line of FIG. 5, 10, 15, or 19 according to one embodiment of the invention.

Referring now to FIG. 28, anvil 66 is illustrated according to one embodiment of the invention. As shown, the anvil 66 of includes an arrangement of discrete projections or welds 98 that extend outward from the anvil face 100. These welds 98 are constructed to (A) fuse first and second web layers 30, 54 together and (B) restrain or anchor the elastic threads 32 in position relative to the first and second web layers 30, 54 in the manufactured elastic composite structure. As described in more detail below, anchoring projections 98 are designed so that an elastic thread 32 that passes between two adjacent anchoring projections 98 on the face 100 of anvil 66 is anchored in position relative to the first and second web layers 30, 54 by frictional resistance that prevents the elastic thread 32 from sliding through the pair of resulting bonds.

As illustrated in FIG. 28, roller assembly 36 includes guide rollers that are employed to accurately position and (optionally) tension the elastic threads 32 and the first and second web layers 30, 54 as they travel toward the bonding apparatus 64. Roller assembly 36 includes include an upper roller 102, a lower roller 104, and a strand guide roller 106 that guide a combined web assembly 108 that includes the first web layer 30, the second web layer 54, and the elastic threads 32 into the roller assembly 36. It is contemplated that rollers 102, 104, 106 may be replaced with other known types of feeding assemblies and/or replaced by a single roller unit or other known type of feeding assembly in an alternative embodiment.

The particular size, shape, and general arrangement of anchoring projections 98 as well as the total number of projections 98 illustrated in FIG. 28 are intended to depict a representative and non-limiting example of an overall pattern of projections 98 on anvil 66. Alternative embodiments may include any number of projections 98 arranged in any number of alternative configurations to achieve a desired pattern of bonds on the end product. The respective working surfaces of anchoring projections 98 may be configured to form bonds of similar size and shape, or bonds of different size and/or shape in alternative embodiments. As non-limiting examples, respective land surfaces of anchoring projections 98 may be circular, rectangular, crescent shaped, or have irregular shapes that may be selected to form a desired overall pattern on the end product. The resulting pattern of bonds will include one or more anchored zones, which fix one or more elastic threads 32 under tension in position relative to the first and second web layers 30, 54.

In a preferred embodiment the anchoring projections 98 are formed on anvil 66 using a machining process that removes bulk material from the anvil 66 to create the desired raised pattern of projections 98 relative to the face 100 of the anvil 66. Alternatively, anchoring projections 98 may be provided on one or more inserts that are mechanically coupled to the face 100 of the anvil 66.

Still referring to FIG. 28, the working surface 110 of the horn 68 has a smooth or substantially smooth surface contour in one non-limiting embodiment. Alternatively, working surface 110 may include an arrangement of projections 98 that mate or align with the pattern of projections 98 on the anvil 66 to further facilitate fusing the first web layer 30 to the second web layer 54 and securing the elastic threads 32 in position relative to the first and second web layers 30, 54.

During the manufacturing process, the first and second web layers 30, 54 are positioned between the face 100 of the anvil 66 and the working surface 110 of the horn 68 as shown in FIG. 28. Elastic threads 32 are positioned between the first and second web layers 30, 54 in a tensioned state. As generally shown in FIG. 28 and in further detail in FIG. 29, the position of horn 68 is controlled to maintain a nip gap 112 between the working surface 110 of horn 68 and the land surfaces 114 of the anchoring projections 98. The size of the nip gap 112 is determined based on parameters of the manufacturing process to facilitate bonding between the first and second web layers 30, 54. Bonding apparatus 64 may include any known positioning means 116 that exerts a force on at least one of the horn 68 and anvil 66 to maintain a desired nip gap 112 between the horn 68 and anvil 66. Positioning means 116 may be an air pressure assembly (not shown) or a mechanical camshaft (not shown) as non-limiting examples.

Anchoring projections 98 may have a planar working surface, planar side surfaces, or some mixture of curved and straight working and side surfaces in alternative embodiments. In the embodiment illustrated in FIG. 29, the land surface 114 of anchoring projection 98 has planar working and side surfaces. In alternative embodiments where the land surface 114 has an arced or curved surface profile, this curved profile permits the first and second web layers 30, 54 to slip relative to the face 100 of the anvil 66 during the bonding process and thus allows the velocity at which the combined assembly 108 including tensioned elastic strands 32 and first and second web layers 30, 54 is advanced toward the bonding apparatus 64 to be increased or decreased relative to the rotational velocity of the anvil 66. When the combined web/thread assembly 108 is advanced at a velocity greater than the velocity of the anvil 66, the resulting bonds are spaced apart by a distance greater than the radial spacing between of adjacent projections 98 on the anvil face 100. Similarly, slowing the feed rate of the combined web/thread assembly 108 relative to the velocity of the anvil 66 will result in bonds that are spaced apart by a distance less than the radial spacing between of adjacent projections 98 on the anvil face 100. The velocity mismatch or differential between web speed and anvil velocity can be controlled to accommodate size changes in the end product. As a result, the bonding of an elastic composite for one size diaper may be carried out with little or no slip, while the bonding of an elastic composite for a larger or smaller diaper may be carried out with a larger amount of slip. A manufacturing line of FIG. 5, 10, 15, or 19 outfitted with an anvil that includes projections 98 with curved surface profiles thus provides for dynamic size changing without having to change the tooling set-up of the manufacturing line, as the same anvil can be used to manufacture multiple sizes of elastic composite structures for use in different sized products.

Figure 30:
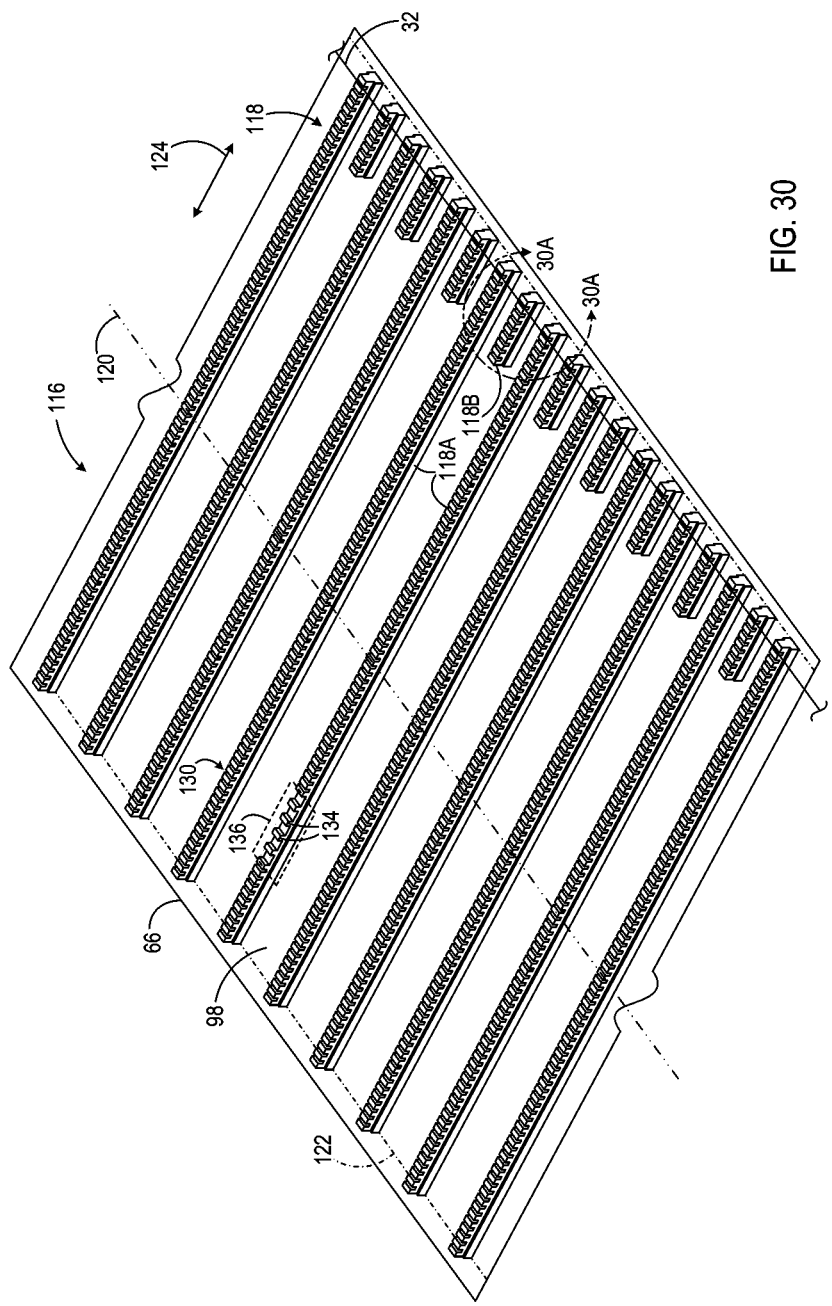
FIG. 30 is a flattened representation of an exemplary anvil pattern usable with the manufacturing line of FIG. 5, 10, 15, or 19 according to one embodiment of the invention.

FIG. 30 is a flattened representation of the circumferential face 100 of anvil 66 according to an embodiment where anvil 66 includes a pattern of projections 118 that form anchored zones. The pattern of projections 118 includes multiple anchoring weld lines 120 that are spaced apart from one another along the circumferential axis 122 of the anvil face 100. The anchoring weld lines 120 define an anchoring region 124 of the projection pattern 118. As with anchoring projections 98 above, in a preferred embodiment, the anchoring weld lines 120 are formed on anvil 66 using a machining process that removes bulk material from the anvil 66 to create the desired raised pattern of anchoring weld lines 120 relative to the face 100 of the anvil 66. Alternatively, anchoring weld lines 120 may be provided on one or more inserts that are mechanically coupled to the face 100 of the anvil 66.

FIG. 30 illustrates anchoring weld lines 120 that extend across substantially the entire longitudinal direction 126 of the rotary anvil 66 (e.g., lines 120A) as well as shorter anchoring weld lines 120 (e.g., lines 120B) that only partially extend along the longitudinal direction. The longitudinal direction 126 generally extends in the cross-machine direction. The bonds or joints formed by the section of the rotary anvil 66 absent the anchoring weld lines 120B are spaced farther apart than the bonds formed by the section including the anchoring weld lines 120B. The closer-spaced bond joints formed by the section including the anchoring weld lines 120B may be preferred when bonding the elastic threads 32 and first and second web layers 30, 54 (not shown in FIG. 30; see FIGS. 5, 10, 15, 19, for example) together in a waist cap portion of the elastic web. However, the spacing between adjacent anchoring weld lines 120 as well as the length and placement of each anchoring weld line 120 along the longitudinal direction 126 may be subject to the design of the bond pattern desired in the finished product.

As shown more specifically in the detailed view provided in FIG. 30A, each weld line 120 contains a pattern of discrete projections 128, 130 that extend outward away from the face 100 of the anvil 66. The projections 128, 130 are spaced apart from one another, by a notch 132 that is defined by the width of a gap 134 positioned between a given pair of adjacent projections 128, 130. The width or size of the gap 134 may anchor one or more elastic threads 32 between adjacent bonds formed by projections 128, 130 such that the elastic thread(s) 32 is held tightly between the adjacent bonds. In this manner, for example, the adjacent bonds constrain the elastic thread(s) 32 such that the elastic thread (s) 32 is retained between the adjacent bonds in the case of a breakage of the elastic thread(s) 32.

Anvil 66 may in addition or alternatively include one or more projections that are referred to herein as laminating or non-anchoring projections 136. As illustrated in FIG. 30, a plurality of lamination projections 136 are shown in a lamination portion 138 of one of the anchoring weld lines 120A. Lamination projections 136, similar to the restraining or anchoring projections 128, 130, fuse first and second web layers 30, 54 to one another. Laminating projections 136 differ from anchoring projections 128, 130 because they do not anchor the elastic threads 32 in position relative to the first and second web layers 30, 54. Accordingly, a broken elastic thread 32 will contract out of the gap between the adjacent lamination weld bonds in contrast to that described above with respect to the anchoring weld bonds. Such laminating projections 136 are advantageous when laminating the first and second web layers 30, 54 in areas designed for elastic deactivation in which the elastic threads 32 are purposely broken in order to create a non-elastic portion of the bonded web layers 30, 54. While only a few of the lamination projections 136 are illustrated in FIG. 30, embodiments of the invention contemplate the use or non-use of any number and placement of the lamination projections 136.

Referring again to FIG. 30A, it is contemplated that the contact surfaces 140 of the projections 128, 130 may have different geometries in alternative embodiments. As non-limiting examples, projections 128, 130 may be circular, rectangular, crescent shaped, or have irregular shapes that may be selected to form a desired overall pattern on the end product. In yet another embodiment, corresponding projections 128, 130 of adjacent weld lines 120 may be aligned with one another in a line parallel to the circumferential axis 122. Alternatively, projections 128, 130 of sequential weld lines 120 may be offset from one another in the cross-machine direction thereby defining a stepped or non-linear passage through the bond lines that are formed on the first and second web layers 30, 54.

FIG. 31 illustrates a non-linear arrangement of the anchoring weld lines 120 according to another embodiment of the invention. A sinusoidal pattern is shown that, when the elastic threads 32 and first and second web layers 30, 54 are bonded together, creates a distinctive gathering pattern as compared with the gathering pattern formed using the linear arrangement shown in FIG. 30. It is contemplated that other arrangement patterns may be formed into the anchoring weld lines 120 in other embodiments of the invention. Such other arrangement patterns may bond the elastic threads 32 and first and second web layers 30, 54 together in geometric or other patterns arranged in straight lines, curved lines, or otherwise arranged to create logos, pictures, other continuous and repeating patterns, or other designs on the end product.

Therefore, according to one embodiment of the invention an elastic composite structure includes a first web layer comprising a first portion, a second portion, and a third portion; a second web layer comprising a first portion and a second portion; and a plurality of elastic threads positioned adjacently to the second and third portions of the first web layer. The first portion of the first web layer is folded over and overlaps the second portion of the first web layer. The folded first portion of the first web layer is directly bonded to one of the second portion of the first web layer and the first portion of the second web layer. A first portion of the plurality of elastic threads is constrained between the folded first portion of the first web layer and the second portion of the first web layer absent adhesive. The third portion of the first web layer is directly bonded to the second portion of the second web layer and traps a second portion of the plurality of elastic threads therebetween.

According to another embodiment of the invention, a method of forming an elastic composite structure includes providing a first web layer comprising a first portion, a second portion, and a third portion; threading a plurality of elastic threads adjacently to the second and third portions of the first web layer; and providing a second web layer comprising a first portion and a second portion. The method also includes folding the first portion of the first web layer over the second portion of the first web layer and bonding the folded first portion of the first web to one of the second portion of the first web layer and the first portion of the second web layer. The method further includes bonding the third portion of the first web layer to the second portion of the second web layer. A first portion of the plurality of elastic threads is trapped between the first and second portions of the first layer absent adhesive and a second portion of the plurality of elastic threads is trapped between the third portion of the first web layer and the second portion of the second web layer.

In accordance with yet another aspect of the invention, an apparatus for forming an elastic composite structure includes a plurality of rollers configured to guide a combined web assembly in a machine direction. The combined web assembly includes a first web layer comprising a first portion, a second portion, and a third portion; a second web layer comprising a first portion and a second portion; and a plurality of elastic threads positioned between the first and second web layers. The apparatus also includes a folding apparatus configured to fold the first portion of the first web layer over the second portion of the first web layer and a bonding apparatus configured to bond the folded first portion of the first web layer to one of the second portion of the first web layer and the first portion of the second web layer such that a first portion of the plurality of elastic threads is trapped between the folded first portion of the first layer and the second portion of the first layer absent adhesive. The bonding apparatus is also configured to bond the third portion of the first web layer to the second portion of the second web layer such that a second portion of the plurality of elastic threads is trapped between the third portion of the first web layer to the second portion of the second web layer.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A method of forming an elastic composite structure comprising:
   providing a first web layer comprising a first portion, a second portion, and a third portion;
   threading a plurality of elastic threads adjacently to the second and third portions of the first web layer;
   folding the first portion of the first web layer over the second portion of the first web layer;
   upon folding the first portion of the first web layer over the second portion of the first web layer, providing a second web layer over the first web layer;
   simultaneously bonding the folded first portion of the first web layer to the second portion of the first web layer and the third portion of the first web layer to the second web layer;
   wherein a first portion of the plurality of elastic threads is trapped between the first and second portions of the first web layer absent adhesive;
   wherein a second portion of the plurality of elastic threads is trapped between the third portion of the first web layer and the second web layer;
   wherein the second web layer completely covers the second portion of the plurality of elastic threads and not the first portion of the plurality of elastic threads;
   wherein the folded first portion of the first web layer is bonded to the second portion of the first web layer around each of the first portion of the plurality of elastic threads; and wherein the third portion of the first web layer is bonded to the second web layer around each of the second portion of the plurality of elastic threads.

2. The method of claim 1, wherein the second portion of the plurality of elastic threads is trapped between the third portion of the first web layer and the second web layer absent adhesive.

3. The method of claim 1, wherein bonding the folded first portion of the first web comprises ultrasonically bonding the folded first portion of the first web to the second portion of the first web layer.

4. The method of claim 1, wherein the plurality of elastic threads over the second portion of the first web layer are completely covered by the folded first portion of the first web layer.

5. A method of forming an elastic composite structure comprising:
   providing a first web layer comprising a first portion, a second portion, and a third portion;
   threading a plurality of elastic threads adjacently to the second and third portions of the first web layer;
   folding the first portion of the first web layer over the second portion of the first web layer;
   upon folding the first portion of the first web layer over the second portion of the first web layer, providing a second web layer over the folded first portion of the first web layer, the second portion of the first web layer, and the third portion of the first web layer;
   simultaneously bonding the folded first portion of the first web to the second portion of the first web layer, the folded first portion of the first web to a first portion of the second web layer, and the third portion of the first web to a second portion of the second web layer;
   wherein a first portion of the plurality of elastic threads is trapped between the first and second portions of the first web layer absent adhesive, and wherein the folded first portion of the first web layer is bonded to the second portion of the first web layer around each of the first portion of the plurality of elastic threads;
   wherein a second portion of the plurality of elastic threads is trapped between the third portion of the first web layer and the second portion of the second web layer absent adhesive; and
   wherein the first portion of the second web layer is bonded to folded first portion of the first web.

6. The method of claim 5 further comprising:
   positioning the first portion of the second web layer to overlap the folded first portion of the first web layer;
   bonding the first portion of the second web layer directly to the folded first portion of the first web layer; and
   bonding the folded first portion of the first web layer directly to the second portion of the first web layer.

7. The method of claim 5, wherein bonding the folded first portion of the first web comprises ultrasonically bonding the folded first portion of the first web to the one of the second portion of the first web layer and the first portion of the second web layer.

8. The method of claim 5, wherein the plurality of elastic threads over the second portion of the first web layer are completely covered by the folded first portion of the first web layer.

* * * * *